US007387196B2

(12) United States Patent
Fritsche et al.

(10) Patent No.: US 7,387,196 B2
(45) Date of Patent: Jun. 17, 2008

(54) DEVICE FOR COMBING AT LEAST TWO PARTIAL FLOWS OF ITEMS TO BE SORTED TO FORM A TOTAL FLOW OF ARTICLES TO BE SORTED

(75) Inventors: Beat Fritsche, Greifensee (CH); Thomas Zimmermann, Wutoeschingen (DE)

(73) Assignee: Siemens Schweiz AG, Zurich (CH)

( * ) Notice: Subject to any disclaimer, the term of this patent is extended or adjusted under 35 U.S.C. 154(b) by 433 days.

(21) Appl. No.: 11/113,145

(22) Filed: Apr. 25, 2005

(65) Prior Publication Data

US 2007/0029234 A1 Feb. 8, 2007

Related U.S. Application Data

(63) Continuation of application No. PCT/EP03/07081, filed on Jul. 3, 2003.

(30) Foreign Application Priority Data

Oct. 29, 2002 (EP) ................................ 02024113

(51) Int. Cl.
*B65G 47/26* (2006.01)

(52) U.S. Cl. ................ 198/460.1; 198/357; 198/461.1

(58) Field of Classification Search ................ 198/357, 198/459.1, 459.8, 460.1, 461.1–461.3, 571, 198/579, 575–577, 601
See application file for complete search history.

(56) References Cited

U.S. PATENT DOCUMENTS

| | | | | |
|---|---|---|---|---|
| 4,360,098 | A * | 11/1982 | Nordstrom | 198/418.1 |
| 4,429,781 | A * | 2/1984 | Holzhauser | 198/448 |
| 4,792,033 | A * | 12/1988 | Iwata et al. | 198/357 |
| 5,161,665 | A * | 11/1992 | Cragun | 198/448 |
| 5,267,638 | A * | 12/1993 | Doane | 198/357 |
| 5,782,332 | A * | 7/1998 | Guidetti et al. | 198/357 |
| 6,292,710 | B1 * | 9/2001 | Bonnet | 700/230 |
| 6,435,331 | B1 * | 8/2002 | Olson et al. | 198/357 |

FOREIGN PATENT DOCUMENTS

WO WO 98/24719 6/1998

* cited by examiner

*Primary Examiner*—James R Bidwell

(57) ABSTRACT

The invention relates to a device for combining at least two partial flows of articles so as to form a total flow. In the total flow, the articles to be sorted are about equidistant from one another. A withdrawal device and a first acceleratable section are arranged in at least one partial flow. The withdrawal device and a second acceleratable section are arranged in at least one second partial flow. A control device is provided that temporarily stores or accelerates the articles separated by the withdrawal device in order to ensure largely equidistant intervals between the articles to be sorted in the total flow.

6 Claims, 2 Drawing Sheets

DEVICE FOR COMBING AT LEAST TWO PARTIAL FLOWS OF ITEMS TO BE SORTED TO FORM A TOTAL FLOW OF ARTICLES TO BE SORTED

CROSS REFERENCE TO RELATED APPLICATIONS

The present application is a continuation of International Application Serial Number PCT/EP2003/007082, filed Jul. 3, 2003, which designated the United States and further claims priority to European patent application 02024113.9, filed Oct. 29, 2002, the both of which are herein incorporated by reference.

BACKGROUND OF THE INVENTION

The invention relates to a device for combing at least two partial flows of articles to be sorted to form a total flow of articles to be sorted.

Such a device is generally used in a sorting conveyor for mail automation, as for example disclosed in European patent application EP 827 786 A1. Generally said sorting conveyor has so-called insertion devices, which insert the flat items to be sorted into pockets on a revolving conveyor. The flat items to be sorted are emptied out of these pockets at the physical destination points assigned to them and can then be routed to their intended location.

Sorting flat items to be sorted is relatively exacting, because the dimensions and ease of handling of flat items to be sorted fluctuates greatly. On the one hand with regard to format alone there are almost an unlimited number of different dimensions for width, height and thickness. Also the packaging and rigidity of flat items to be sorted varies enormously, as represented for example by the opposing examples of rather hard, rigid cardboard envelopes and quite soft brochures and magazines packaged in film. Particularly problematic also are the so-called mail shots, which generally contain advertising material and often simply comprise a collection of loose sheets with advertising inserts inserted as well, which extend beyond the dimensions of the other sheets.

Generally such mail shots and other flat items to be sorted are inserted in horizontal stacks into the feed device mentioned above and have to be withdrawn from said stacks individually, which per se is also a very exacting task from a technical point of view. In order that these flat, generally horizontal, items to be sorted can be inserted by means of an insertion device into the revolving sorting conveyor, it is necessary to stand said items to be sorted vertically. Standing them up means it is in turn necessary for the items to be sorted to be fed to the device to stand up the items to be sorted with very precise positioning. This is complicated by the fact that the less rigid and per se not very homogenous items to be sorted, e.g. the above-mentioned mail shots, are particularly difficult to handle and therefore generally cannot be fed in by automated means but have to be positioned manually on the feed device from an input point, which represents a significant cost factor. One solution to this problem is disclosed in the not previously published European patent application EP 02 019 419.

With regard to the present invention described below, it must be possible for standard flat mail items (letters, magazines, generally flat envelopes) and the items to be sorted as described above, which are rather more problematic with regard to handling, to be sorted using a common sorting conveyor and in a common sorting run to the physical destination points, for which at present there are no solutions in the prior art.

SUMMARY OF THE INVENTION

The object of the invention is therefore to specify a device for feeding flat items to be sorted to an input device for a sorting conveyor, which makes it possible to feed in the above-mentioned particularly problematic items to be sorted and standard mail items for further processing in particular also at the same time.

The above-mentioned object is achieved according to the invention by a device for combining at least two partial flows of items to be sorted to form a total flow of items to be sorted, in which the items to be sorted are largely at equidistant intervals from each other, at a combining section, a) a withdrawing device operated in an interruptible manner and a first acceleratable section connected downstream from this withdrawing device operated in an interruptible manner being arranged in at least a first partial flow, b) a withdrawing device operated without interruption and a second acceleratable section connected downstream from this withdrawing device operated without interruption being arranged in at least a second partial flow;

c) a control device being provided, which buffers the items to be sorted which are separated by the withdrawing device operated without interruption on the second acceleratable section or accelerates them to ensure that the items to be sorted remain at largely equidistant intervals from each other in the total flow.

In this manner it is possible for the items to be sorted which were previously problematic to handle, such as advertising leaflets, mail shots, etc. with loose-leaf inserts, to be withdrawn continuously and individually from a stack in the second partial flow without being subject to the risk of paper jams as a result of interruptions. According to the invention the mail items that are relatively easy to handle can be withdrawn as required in the other partial flow, so that the acceleratable sections (acceleratable here meaning faster or slower) result in an organisation of the items to be sorted in the two partial flows, which can be achieved using the control device and which produces the required total flow of largely equidistant items to be sorted in the combining section.

The above-mentioned organisation of the items to be sorted arriving in the two partial flows is assisted particularly when the second acceleratable section can be operated by means of a control device such that a buffer period is defined for one of the items to be sorted delivered periodically in the second partial flow, which is at least as long as the conveyance period required by an item to be sorted in the first partial flow to cover the first acceleratable section plus the required largely equidistant interval between two adjacent items to be sorted in the total flow. It is possible in this manner to maintain the uninterrupted operation of the second withdrawing device even when mail items are fed into the combining section from the other partial flow.

One solution that is particularly simple to configure from the point of view of control technology provides a first or second acceleration point for the first and second acceleratable sections, which serves as a clearing point for the control device. In a further embodiment of this advantageous feature, the control device can stop each item to be sorted at the first or second acceleration point and mark it internally as ready for insertion. In other words the control device "notices" quickly in which partial flow an item for sorting ready for insertion at this defined point is located. Comparatively simple decision criteria can thereby be used, if the control device decides to feed the items to be sorted to the combining section at a decision point and in a decision condition, whereby:

a) the decision point is represented by a time when an item to be sorted marked as ready for insertion can be inserted into the total flow, thereby achieving the required equidistant interval; and b) the decision condition prefers the feeding of an item to be sorted from the second partial flow to the feeding of an item to be sorted from the first partial flow, when an item to be sorted is marked as ready for insertion in the second partial flow and otherwise provides for the feeding of an item to be sorted from the first partial flow.

One particularly advantageous solution due to design results when the gap between two items to be sorted in the second partial flow is greater than the sum of the maximum length of an item to be sorted permitted for the first partial flow and the required equidistant interval in the total flow. Both withdrawing devices can thus be tailored to each other and adjusted in respect of their sorting capacity largely as a function of the permitted sizes of items to be sorted. It is thereby expedient for the transport period for the items to be sorted on the first and second acceleratable sections to be approximately equal.

Further advantageous embodiments of the invention will emerge from the other subclaims.

BRIEF DESCRIPTION OF THE SEVERAL VIEWS OF THE DRAWINGS

Exemplary embodiments of the invention are described in more detail below with reference to a drawing, in which.

DETAILED DESCRIPTION OF THE INVENTION

Figure 1:
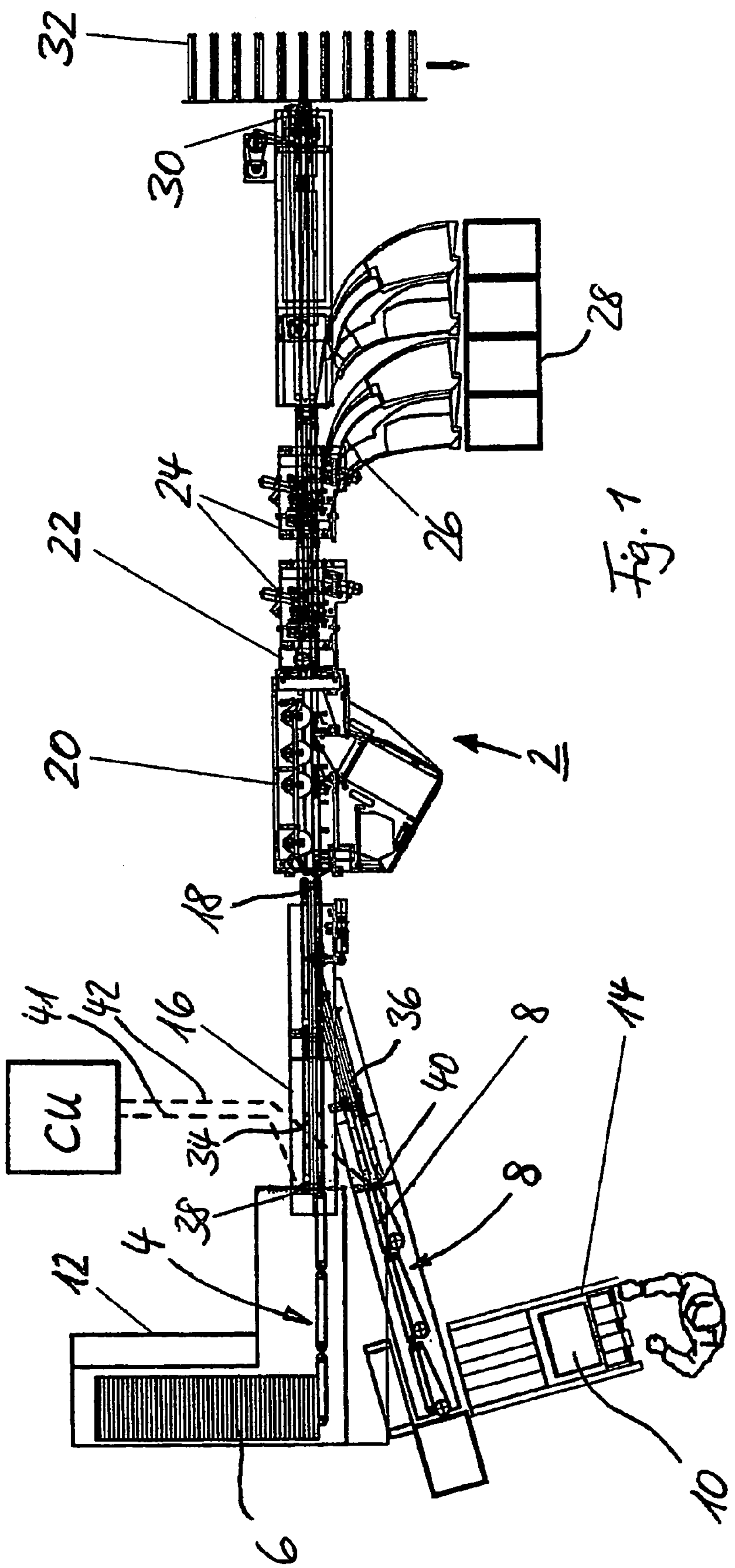
FIG. 1 shows a schematic representation of a top view of a sorting device with a first and second partial flow.

FIG. 1 shows a schematic representation of a top view of a sorting device 2 with a first partial flow 4 of standard flat mail items 6 and a second partial flow 8 of comparatively difficult to handle advertising leaflets 10 in the form of interleaved loose sheets. The first partial flow 4 is generated by a first withdrawing device 12, which is operated discontinuously as a slave and referred to in technical parlance as a universal feeder, and the second partial flow 8 is operated by a second withdrawing device 14, which is operated continuously as the master and referred to in technical parlance as the ECR feeder.

The two partial flows 4, 8 are combined in a combining section 16 to form a total flow 18, in which the mail items 6 and advertising leaflets 10 are fed at 400 mm intervals from each other first to an address reader 20, a format controller 22, a deflector 24 for chutes 26 and destination boxes 28 beyond these chutes 26 or a loader 30 and destination points 32 beyond this loader 30 and are thus sorted into destination boxes 28 and destination points 32 corresponding to their intended locations. The 400 mm interval is thus required so that the mail items 6 and advertising leaflets 10 in the total flow 18 can be fed without disruption to their destination boxes 28 and destination points 32 according to the processing period of the sorting process as defined by the equipment. This is all the more exacting, as the conveyance speed in the main flow 18 can easily reach and generally also has to be several meters per second, in order to achieve a satisfactory sorting capacity.

Before the mail items 6 and advertising leaflets 10 carried in the partial flows 4, 8 are fed to the combining section 16 and combined there to form the total flow 18, they pass through a first or second acceleration section 34 or 36, which has a defined acceleration point 38 or 40. At these acceleration points 38, 40 the mail items 6 and the advertising leaflets 10 are first stopped by a control device CU and marked as ready for insertion, which is characterised by the broken control lines 41, 42.

The mode of operation of this sorting device 2, i.e. in particular the combining process, is now described with reference to FIG. 2, which explains the temporal pattern of the two partial flows 4, 8 and the total flow 18. It thereby becomes very clear that in the second partial section 8 a continuous flow of advertising leaflets 10*a* to 10*d* is transported continuously at a conveyance interval of 2000 mm. In the first partial flow 4 however the mail items 6*a* to 6*g* are fed in discontinuously and are easier to organise because they are easier to handle.

For the combining process the control device CU closely monitors the situation at the acceleration points 38, 40, i.e. it checks at which of the acceleration points 38, 40 there is a mail item 6*a* to 6*g* marked as ready for insertion or an advertising leaflet 10*a* to 10*d* marked as ready for insertion. At this so-called decision point, which always exists when a mail item 6*a* to 6*g* or an advertising leaflet 10*a* to 10*d* could be transported in the total flow 18 at the required interval of 400 mm from the mail item/advertising leaflet in front of it in the total flow 18, the decision condition is processed by the control unit CU.

This decision condition provides for an advertising leaflet 10*a* to 10*d* having priority over a mail item 6*a* to 6*g*, in so far as said advertising leaflet 10*a* to 10*d* is marked as ready for insertion at the second acceleration point 40. Otherwise a mail item 6*a* to 6*g* marked as ready for insertion is inserted into the total flow 18. For the second partial flow 8 this means that an advertising leaflet 10*a* to 10*d* must therefore be buffered in the second acceleration section 36 for as long as a mail item with the largest permitted dimensions, e.g. mail items 6*b* and 6*g*, takes to cover the first acceleration section 34 plus the required 400 mm interval in the total flow 18. An advertising leaflet retained for this time at the second acceleration point 40 must then be inserted mandatorily according to the decision condition into the total flow 18 as the next item to be sorted, because otherwise there would be a fatal jam of advertising leaflets 10*a* to 10*d* due to the continuous conveyance of advertising leaflets 10*a* to 10*d* in the second partial flow 8.

Figure 2:
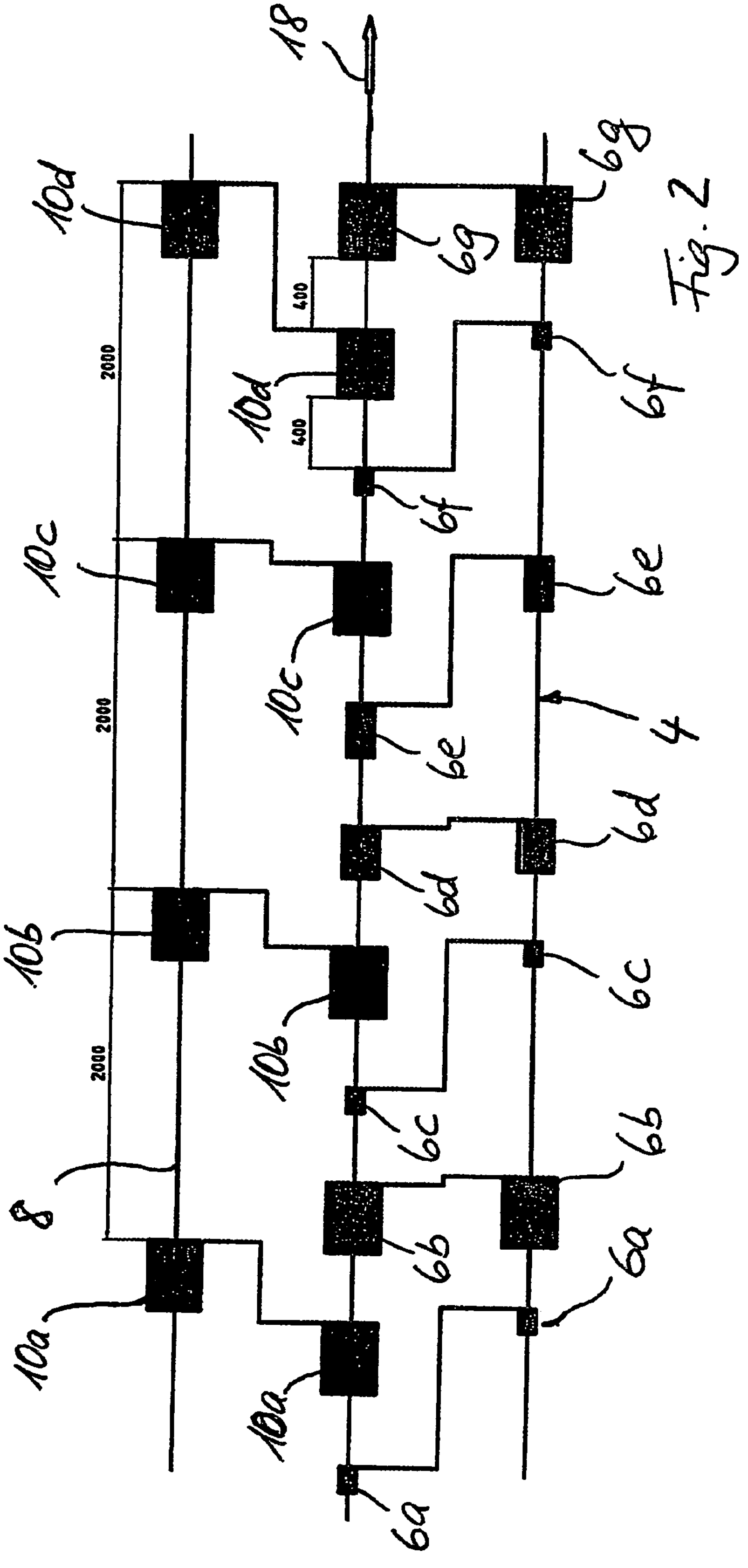
FIG. 2 shows a schematic view of the times of entry of the items to be sorted from both partial flows into the combined total flow.

The temporal pattern shown in FIG. 2 shows that actually every mail item 6*a* to 6*g* and every advertising leaflet 10*a* to 10*d* is slightly delayed by the control device CU at different intervals, so that the total flow 18 can be achieved with the required constant interval between the mail items 6*a* to 6*g* and advertising leaflets 10*a* to 10*d*. The larger gaps in the partial flow 4 show that the first withdrawing device 12 is controlled by the control device CU such that a mail item 6*a* to 6*g* marked as ready for insertion at the first acceleration point 38 is supplied within the shortest cycle time.

If these mail items 6a to 6g marked as ready for insertion cannot be conveyed in the combining section 16, because the advertising leaflets 10a to 10d preferred on the basis of the decision condition are being conveyed, the first withdrawing device 12 interrupts its operation. However so that mail items 6*a* to 6*g* also join the line, the gap between two advertising leaflets 10*a* to 10*d* conveyed in the second partial flow 8 is selected as so large that the gap is at least the length of the largest permitted mail item 6*b*, 6*g* plus the required interval of 400 mm.

The invention claimed is:

1. A device for combining at least two partial flows of first and second items to be sorted so as to form a total flow of items to be sorted, in which the items to be sorted are at largely equidistant intervals from each other at a combining section, the device comprising:

a first withdrawing device configured to withdraw first mail items discontinuously and at different distances to each other;

a first section connected downstream from the first withdrawing device and configured to accelerate the first mail items, wherein the first withdrawing device and the first section are arranged in at least a first partial flow;

a second withdrawing device configured to withdraw second mail items continuously and equidistantly to each other without interruption;

a second section connected downstream from the second withdrawing device and configured to accelerate the second mail items, wherein the second withdrawing device and the second section are arranged in at least a second partial flow; and a control device configured to buffer or accelerate the second items to be sorted conveyed on the second section to ensure that the second items to be sorted remain largely at equidistant intervals from each other in the total flow, wherein the control device is further configured to control the second section such that a buffer period for one of the items to be sorted and delivered periodically in the second partial flow is at least as long as a conveyance period required by an item to be sorted in the first partial flow to cover the first section plus required largely equidistant interval between two adjacent items to be sorted in the total flow.

2. The device according to claim 1, wherein the first section has a first acceleration point and the second section has a second acceleration point, wherein each of the first and second acceleration points operates as a clearing point for the control device.

3. The device according to claim 2, wherein the control device is configured to stop each first mail item at the first acceleration point and each second mail item at the second acceleration point, and to mark each item as ready for insertion by means of control technology.

4. The device according to claim 3, wherein the control device is configured to decide whether to feed the items to be sorted to the combining section at a decision point and depending on a decision condition, whereby the decision point is represented by a time when an item to be sorted marked as ready for insertion can be inserted into the total flow thereby achieving the required equidistant interval; and said decision condition is set to prefer feeding an item to be sorted from the second partial flow over feeding of an item to be sorted from the first partial flow when an item to be sorted is marked as ready for insertion in the second partial flow and otherwise provides for feeding of an item to be sorted from the first partial flow.

5. The device according to claim 1, wherein a gap between two items to be sorted in the second partial flow is greater than a sum of maximum length of an item to be sorted permitted for the first partial flow and a required equidistant interval in the total flow.

6. The device according to claim 5, wherein a transport period for the items to be sorted on the first or second section is approximately equal.

* * * * *